United States Patent
Prater

[11] Patent Number: 5,893,704
[45] Date of Patent: Apr. 13, 1999

[54] TORQUE CONVERTER

[75] Inventor: Ronald E. Prater, Rochester, Mich.

[73] Assignee: Koppy Corporation, Orion, Mich.

[21] Appl. No.: 08/821,453

[22] Filed: Mar. 20, 1997

[51] Int. Cl.[6] .................................................. F16D 33/00
[52] U.S. Cl. ................ 416/197 C; 416/180; 416/213 A; 29/889.5
[58] Field of Search .............................. 416/197 C, 180, 416/213 A, 213 R; 60/330; 29/889.5

[56] References Cited

U.S. PATENT DOCUMENTS

| | | | |
|---|---|---|---|
| 2,478,306 | 8/1949 | Orr | 416/180 |
| 3,545,883 | 12/1970 | Iijima | 416/180 |
| 3,550,234 | 12/1970 | Herold | 416/180 |
| 4,868,365 | 9/1989 | Farone et al. | 416/180 |
| 5,113,654 | 5/1992 | Sahashi | 29/889.21 |
| 5,122,199 | 6/1992 | Schroth | 148/528 |

*Primary Examiner*—Edward K. Look
*Assistant Examiner*—Richard Woo
*Attorney, Agent, or Firm*—Howard & Howard

[57] ABSTRACT

A torque converter for an automatic transmission includes a turbine having the vanes thereof retained by tabs which fit into fluid-tight recesses formed in the housing of the turbine.

20 Claims, 2 Drawing Sheets

TORQUE CONVERTER

BACKGROUND OF THE INVENTION

This invention relates generally to torque converters for automatic transmissions. More specifically, the invention relates to a turbine for a torque converter, in which the vanes thereof are retained by particularly configured, fluid-tight recesses.

Automatic transmissions operate to shift gears in a motor vehicle, without assistance from the driver. The development of the automatic transmission has simplified driving and made it accessible to a large portion of the population. The torque converter is an essential part of an automatic transmission. It is a fluid coupling which operates to transmit engine power to the transmission's gear system, and in some instances, to increase torque at low vehicle speeds.

A torque converter basically comprises a pump portion and a turbine portion disposed in fluid communication. A series of vanes associated with the pump propel a working fluid when the pump is rotated. The fluid strikes a set of vanes on the turbine and causes the turbine to rotate. In this manner, the engine and driving gears are mechanically coupled through a body of fluid by the joint action of the turbine and pump. Further structures such as a split-ring fluid guide and a vaned stator increase the efficiency of the unit and provide for torque multiplication.

Clearly, any improvement which can increase the reliability, fuel economy or performance of an automatic transmission will be of significant value. Additionally, any process which simplifies the manufacture of transmission components will also be of importance. The present invention, as will be explained in greater detail hereinbelow, provides an improved torque converter which is more efficient in delivering engine power to the drive train of a vehicle. Additionally, the torque converter is highly reliable and easy to manufacture. These and other advantages of the present invention will be readily apparent from the drawings, discussion and description which follow.

SUMMARY OF THE INVENTION

There is disclosed herein a turbine-pump assembly for a torque converter of an automatic transmission. The assembly includes a pump which comprises a pump housing configured as a radially bisected torus having a plurality of impeller vanes disposed thereupon. The assembly further includes a turbine which comprises a turbine housing configured as a radially bisected torus having a convex exterior surface and a concave interior surface and a material thickness as measured between the exterior and interior surface. The interior surface includes a plurality of recesses defined therein. Each recess is fluid tight and has a depth which is greater than the material thickness of the housing. The turbine further includes a plurality of turbine vanes, each vane including a tab portion which is retained in a respective one of the recesses so as to support the vanes upon the interior surface of the turbine housing.

In a particular embodiment, each of the recesses includes a relatively planar bottom and at least two side walls which form a right angle with the bottom. In some instances, the recesses include four side walls which form right angles with the bottom. The turbine housing may be fabricated from a ferrous alloy such as 1010 steel and, in some instances may have a material thickness in the range of 1.5–2 millimeters. The pump housing may also be manufactured from 1010 steel and may have a thickness of approximately 5 millimeters. The pump housing may also include a plurality of recesses defined therein for retaining tab portions associated with the pump vanes. The tabs may be retained in the recesses by means of a body of brazing material.

In some embodiments, the assembly may further include a split-ring fluid guide. The split-ring fluid guide may include a first and a second portion which are respectively affixed to the turbine and the pump by means of tab-like projections on the vanes which are retained in a series of slots in the split-ring fluid guide.

DETAILED DESCRIPTION OF THE PREFERRED EMBODIMENT

Figure 1:
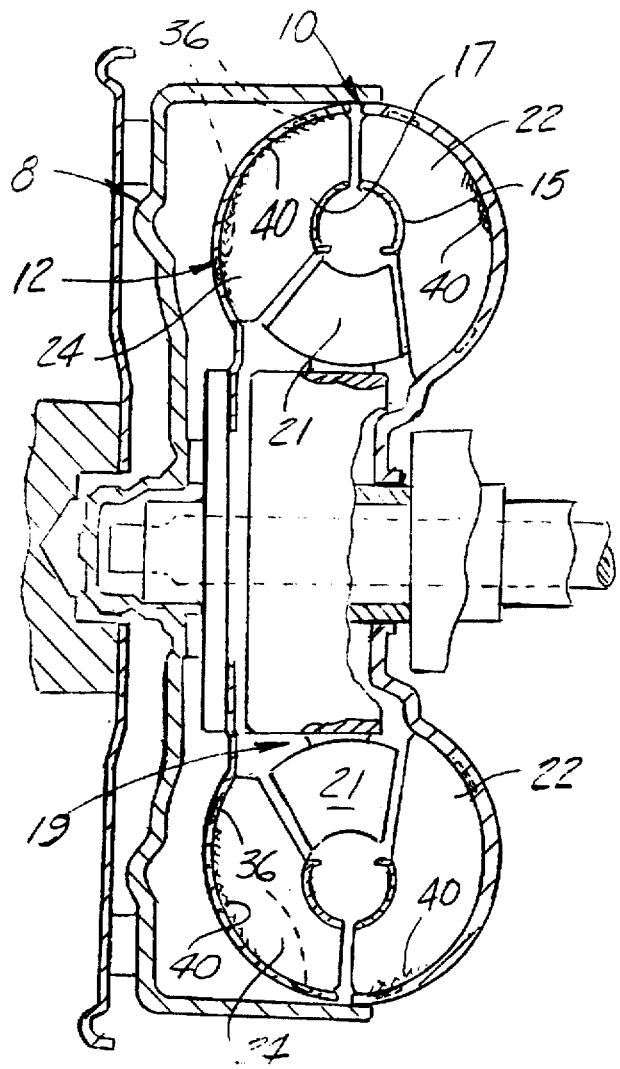
FIG. 1 is a cross-sectional view of a portion of an automatic transmission illustrating the torque converter thereof.

Referring now to FIG. 1, there is shown a cross-sectional view of a torque converter 8, of the type which may incorporate the present invention. The converter includes a pump portion 10 and a turbine portion 12. The pump portion and turbine portion each include vanes associated therewith, as described above, and in the figure, some of the pump vanes 22 and turbine vanes 24 are visible. As discussed, the motion of the pump vanes 22 propels a working fluid against the turbine vanes 24 so as to transfer energy thereto. In the illustrated embodiment, the torque converter 8 further includes a split-ring fluid guide. This guide increases the efficiency of the torque converter by directing fluid flow between the pump and turbine to the periphery of the converter. As illustrated, the split-ring fluid guide includes a first portion 15 associated with the vanes 22 of the pump 10, and a second portion 17 associated with the vanes 24 of the turbine. It will be noted that the two portions 15, 17 of the split-ring fluid guide define a toroidal space within the torque converter 8, and because of their configuration direct the fluid flow from the pump 10 to the turbine 12 along the outer regions of the converter 8. Return flow of fluid from the turbine 12 to the pump 10 occurs in the more innermost portions of the converter.

In order to further maximize the efficiency of torque converters, it is known in the art to include a stator assembly therewith. The stator is disposed in the more interior portion of the torque converter and functions to redirect the return flow of fluid from the turbine 12 to the pump 10. In the illustrated embodiment, the stator assembly is shown at reference numeral 19, and it includes a number of vanes 21. Typically the stator 19 is mounted by means of a one way clutch so that it is immobile when the pump portion 10 of the torque converter 8 is rotating faster than the turbine portion 12, and so that it rotates with the pump 10 and turbine 12 when their rates of rotation are approximately similar. The stator 19 provides torque multiplication at low speed.

Figure 2:
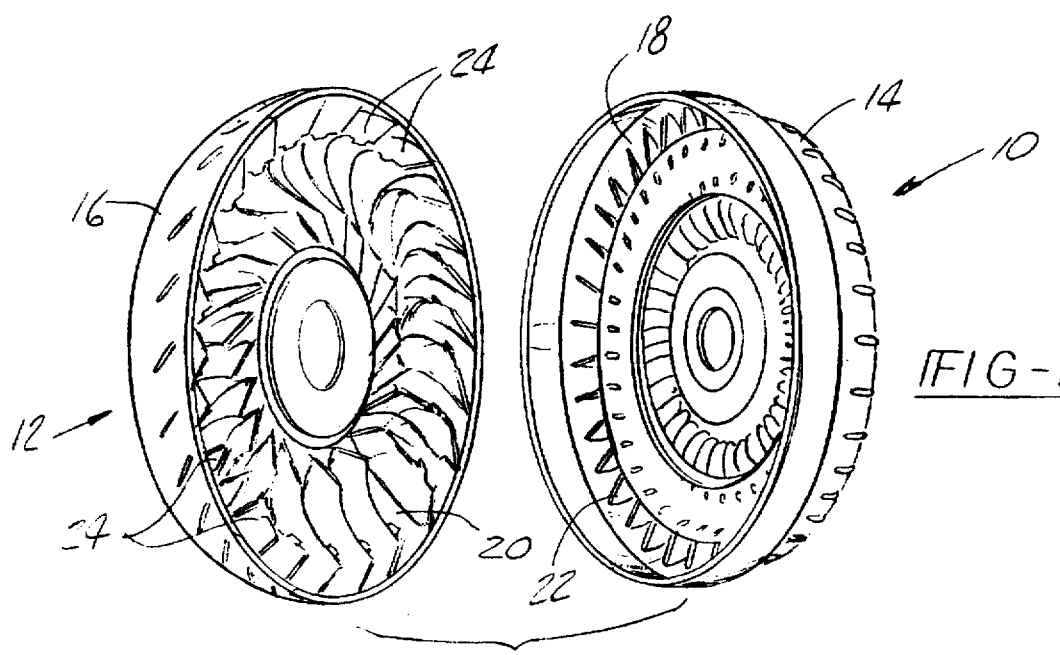
FIG. 2 is a perspective view showing a pump and turbine for a torque converter structured in accord with the principles of the present invention.

Referring now to FIG. 2, there is shown a perspective view of the pump 10 and a turbine 12 of the torque converter of FIG. 1. It will be noted that each of these members is generally configured as a radially bisected torus, said term meant to define a hollow, torroidal structure which is cut along a plane passing generally through the center thereof, and coincident with the radii thereof. Each of the members is thus configured to include an exterior surface, for example surface 14 of the pump 10 and surface 16 of the turbine 12, which is of convex shape; and an interior surface, for example, surface 18 of the pump 10, and surface 20 of the turbine 12, which is of concave shape. The pump 10, which in some instances is also referred to as an impeller includes a series of pump vanes 22 on the interior surface 18 thereof. In a similar manner, the turbine 12 includes a series of turbine vanes 24 on the interior surface 20 thereof. In use, the pump and impeller are disposed in a housing which is filled with a transmission fluid.

Heretofore, the vanes were attached to the components of the torque converter, and particularly to the turbine, by means of tabs which were fitted into slots formed in the housing of the turbine. The tabs passed through the housing and were bent over, and in some instances, brazed or soldered to retain them thereupon. In accord with the present invention, it has been recognized that this particular construction is a source of inefficiency and potential failure. The aforedescribed construction is generally not fluid-tight; consequently, transmission fluid, which is under pressure from the vanes, can pass through the housing and as such represents a loss in power and fuel economy. Additionally, the vane construction can loosen, resulting in catastrophic failure of the transmission. Additionally, the metalworking process by which the holes are formed through the housing generates burrs. It is frequently difficult to remove all of the burring and, in use, burrs can work loose from the housing and cause wear or damage to critical components of the hydraulic system of the transmission. In accord with the present invention, there is provided a construction whereby the vanes are attached to the housing of the turbine through a series of fluid tight recesses defined therein. The recesses are formed by a metalworking process which displaces metal without burr formation.

Figure 3:
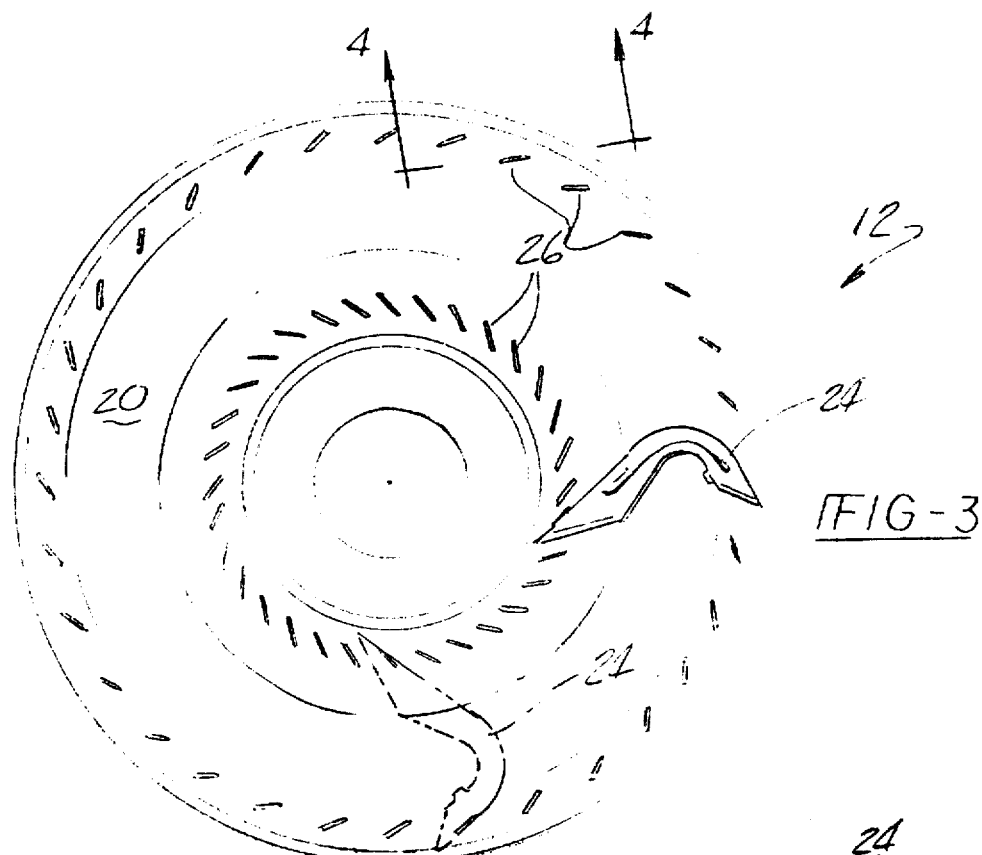
FIG. 3 is a top plan view of a portion of a turbine structured in accord with the principles of the present invention.

Referring now to FIG. 3, there is shown a top plan view of the turbine 12. For purposes of this illustration, only one vane 24 is shown attached to the turbine 12. Also visible in this figure are a series of recesses 26 which are defined upon the interior surface 20 of the housing of the turbine 12. As will be detailed hereinbelow, the recesses 26 are particularly configured in accord with the present invention. The vanes 24, are retained in the housing by means of tabs which fit into these recesses 26. Also, while the recesses 26 are shown as forming two rows, it is to be understood that in some instances, additional rows, and additional tabs on the vanes may be employed.

Figures 4, 5:
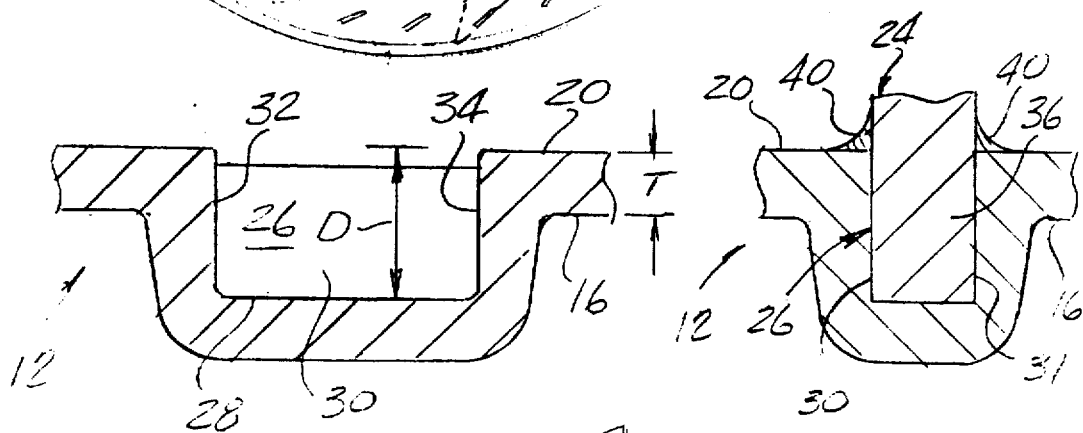
FIG. 4 is a cross sectional view of a portion of the turbine of FIG. 3 taken along lines IV—IV and illustrating the recess formed therein.
FIG. 5 is a cross sectional view of a portion of a turbine structured in accord with the principles of the present invention showing a recess having a tab of a vane retained therein.

Referring now to FIG. 4, there is shown a cross sectional view of a portion of the housing of the turbine pump of FIG. 3 taken along line IV—IV and passing through one of the recesses 26. It will be noted from FIG. 4 that the housing has a material thickness "T" which is measured between the interior surface 20 and exterior surface 16 of the turbine 12. The recess 26 is fluid-tight and, as such, includes no openings between the interior 20 and exterior surface 16 of the turbine 12. The recess 26 has a depth "D" which is greater than the material thickness. Additionally, the recess 26 includes a generally planar base 28 and a side wall 30, as well as endwalls 32 and 34, which join the base 28 at approximate right angles.

Figure 6:
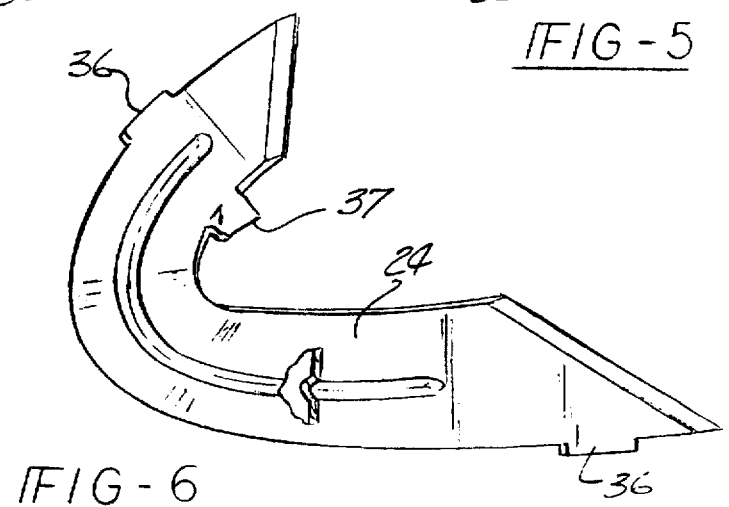
FIG. 6 is a front elevational view of one design of vane which may be employed in the practice of the present invention.

Referring now to FIG. 6, there is shown a perspective view of a vane 24 of the type which may be employed in the present invention. The vane 24 includes a pair of mounting tabs 36 integral therewith, and the recesses 26 in the turbine housing 12 are configured to receive and retain these tabs 36. As mentioned above, the vane 24 may include a larger number of mounting tabs in some instances. Also, it will be noted that the vane 24 also includes a tab-like projection 37 which is used to fasten the split-ring fluid guide thereto. This projection typically passes through a slot in the fluid guide and is bent over, and in some instances welded, brazed or soldered to retain it to the vane.

Referring now to FIG. 5, there is shown a cross sectional view of a portion of a turbine housing 12 generally similar to that shown in FIG. 3, but taken in a direction orthogonal to the view in FIG. 4, and further illustrating the mounting of a vane 24 therein. As will be seen from the drawing, the tab portion 36 of the vane 24 is fitted into the recess 26. As illustrated, the tab 36 and recess 26 are configured so as to achieve a relatively tight press fit with the side walls 30, 31. As further illustrated, the tab 36 is also retained in the slot 26 by a body of brazing alloy 40, and it is to be understood that other means for securing the vane, such as solder, welding, or in some instances, a high strength adhesive may be similarly employed. It will be apparent from the illustration of FIG. 4 that the vane is retained in a manner which is secure, rigid and fluid-tight.

The turbine housing is typically fabricated from a metallic alloy, particularly a ferrous alloy, and in one preferred embodiment, 1010 alloy steel. The recesses are formed therein by a metalworking process, which deforms and displaces metal without effecting any removal thereof. This process provides an accurately configured recess without any burr formation. Typically, the shaping process is accomplished by forcing a hardened blade-like die into the metal, usually by means of a hydraulically operated press. This process is termed "lancing;" however, in some instances, the term lancing is strictly applied to those processes wherein a metal workpiece is pierced completely through, generally without any significant removal of metal stock. Within the context of this disclosure the term lancing will be used broadly, to define any metal shaping process for the formation of fluid tight recesses, which process does not effect significant removal of workpiece stock, and it is to be understood that any such process may be employed in the practice of the present invention.

The depth of the recess is an important parameter since it is this dimension which provides space for retention of the tab. The integrity of the turbine will depend upon the vanes being solidly retained, and for this reason it is preferable to have a substantial length of tab retained in the recess. If a recess were employed which was of a lesser depth than the material thickness of the housing, it would be very difficult to retain the tab therein, unless the overall material thickness of the housing was so great as to permit sufficient depth to be achieved without exceeding material thickness. In such instance, the excess material would unduly contribute to the cost, weight and inefficient operation of the assembly.

In some instances, the pump housing of prior art torque converters include a series of recesses formed therein for retention of the tabs; however, these prior art recesses do not have a depth exceeding the material thickness of the pump housing. Additionally, such prior art recesses do not include squared off sides; hence, retention of tabs therein is generally difficult and necessitates the extensive use of brazing alloys, welds and the like. Accordingly, it will be appreciated that the principles of the present invention may also be adapted for use in connection with the pump portion of torque converters.

In one particularly preferred embodiment of the present invention, the turbine housing comprises 1010 alloy steel of approximately 1.5–2 millimeters in thickness. The recesses formed therein are approximately 3 millimeters in depth and include relatively flat bottoms and squared off sides. The vanes are fabricated from 1010 steel stock of approximately 1 millimeter thickness, and the width of the recesses is also approximately 1 millimeter, so as to correspond to the thickness of the projecting tabs on the vanes. The turbine is employed in conjunction with a pump having a housing of approximately 5 millimeters in thickness. The pump housing in this embodiment, includes recesses of approximately 4 millimeters depth formed therein for a retention of vane tabs, although it is to be understood that the recesses of the present invention may be advantageously incorporated therewith. It has been found that when incorporated in an automatic transmission, the torque converter of the present invention provides for increased fuel economy and engine power.

In view of the foregoing drawings, discussion and description, various modifications of the present invention will be readily apparent to one of skill in the art. The foregoing is merely meant to be illustrative of particular embodiments of the invention, and not a limitation upon the practice thereof. It is the following claims, including all equivalents, which define the scope of the invention.

I claim:

1. A turbine-pump assembly for a torque converter of an automatic transmission including:
   a pump comprising a pump housing configured as a radially bisected torus having a plurality of impeller vanes disposed thereupon;
   a turbine comprising:
   a turbine housing configured as a radially bisected torus having a convex exterior surface, a concave interior surface and a material thickness as measured between said exterior surface and said interior surface, said interior surface including a plurality of recesses defined therein, each recess being fluid-tight and having a depth which is greater than said material thickness;
   a plurality of turbine vanes, each vane including a tab portion that has a length that is approximately equal to said recess depth and which is fixedly retained in a respective one of said recesses so as to support said vanes upon the interior surface of said turbine housing.

2. An assembly as in claim 1, wherein said recesses each include a relatively planar bottom, and at least two side walls which form a right angle with said bottom.

3. An assembly as in claim 2, wherein said recesses further include two endwalls which form a right angle with said bottom.

4. An assembly as in claim 1, wherein said turbine housing is fabricated from a ferrous alloy.

5. An assembly as in claim 4, wherein said ferrous alloy is 1010 steel.

6. An assembly as in claim 1, wherein said material thickness is in the range of approximately 1.5–2 millimeters and said recess depth is approximately three millimeters.

7. An assembly as in claim 1, wherein said tab portion of each turbine vane is retained in its respective recess by a body of brazing material.

8. An assembly as in claim 1, wherein said pump housing is approximately 5 millimeters thick.

9. An assembly as in claim 8, wherein said pump housing includes a plurality of blanked recesses defined therein and wherein each of said pump vanes includes a tab portion configured to be retained in a respective one of said recesses in the pump housing.

10. An assembly as in claim 1, further including a split-ring fluid guide.

11. An assembly as in claim 1, wherein said split-ring fluid guide includes a first portion having a slot formed there through and said first portion is affixed to the turbine by means of a projection which is associated with one of said turbine vanes and which passes through the slot.

12. A turbine-pump assembly for a torque converter of an automatic transmission including:
   a pump comprising a pump-housing configured as a radially bisected torus having a plurality of pump vanes disposed thereupon;
   a turbine comprising:
   a turbine housing configured as a radially bisected torus having a convex exterior surface, a concave interior surface, and a material thickness as measured between said interior surface and said exterior surface, said interior surface including a plurality of recesses defined therein, each recess being fluid tight and having a generally planar base and at least two side walls which are disposed at right angles to said base;
   a plurality of turbine vanes, each vane including a tab portion which includes two sides that are configured to snugly engage said recess side walls when said tab is press fit into and fixedly retained by a respective one of said recesses so as to support the vane with which it is associated, upon the interior surface of the turbine housing.

13. An assembly as in claim 12, wherein said material thickness is in the range of 1.5–2 millimeters, and wherein said recesses have a depth of approximately 3 millimeters.

14. A method for the manufacture of a turbine for an automatic transmission, said method including the steps of:
   providing a turbine housing which is configured as a radially bisected torus having a convex exterior surface, concave interior surface and a material thickness as measured between said exterior surface and said interior surface;
   lancing the interior surface of said turbine housing so as to form a plurality of recesses therein, each recess being fluid-tight and having a depth which is greater than said material thickness;
   providing a plurality of vanes, each vane including a tab portion; and
   placing each said tab portion into a corresponding one of said recesses and fixedly securing said tab portions within said recesses so as to retain said vane on said interior surface of the housing.

15. The assembly of claim 14, wherein said recess is rectangular and wherein said turbine vane tabs have rectangular shape such that said tabs are in snug engagement with said recesses.

16. The assembly of claim 15, wherein said tab portions are press-fit into said recesses.

17. The assembly of claim 12, further comprising a bonding agent that facilitates fixedly retaining said tab portions within said recesses.

18. The assembly of claim 17, wherein said bonding agent comprises a body of brazen material in contact with said vane and said interior surface.

19. The method of claim 14, further comprising affixing a bonding agent to a surface one each said vane and said interior surface of said turbine housing adjacent each said recess.

20. The method of claim 14, further comprising affixing a body of brazen material to a surface on each said vane and said interior surface of said turbine housing adjacent each said recess.

* * * * *